(12) United States Patent
Koshita

(10) Patent No.: US 7,482,832 B2
(45) Date of Patent: Jan. 27, 2009

(54) TERMINATION CIRCUIT AND SEMICONDUCTOR DEVICE COMPRISING THAT TERMINATION CIRCUIT

(75) Inventor: Gen Koshita, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 44 days.

(21) Appl. No.: 11/434,715

(22) Filed: May 17, 2006

(65) Prior Publication Data

US 2006/0267628 A1 Nov. 30, 2006

(30) Foreign Application Priority Data

May 25, 2005 (JP) ............................. 2005-152817

(51) Int. Cl.
*H03K 19/0175* (2006.01)
*H03K 19/094* (2006.01)
(52) U.S. Cl. ............................. 326/30; 326/82; 326/86
(58) Field of Classification Search .................... 326/30
See application file for complete search history.

(56) References Cited

U.S. PATENT DOCUMENTS 7,030,645 B2 * 4/2006 Schafer ....................... 326/30
7,068,078 B2 * 6/2006 Yoo ............................ 326/87
2004/0251940 A1 12/2004 Hayashi et al.

FOREIGN PATENT DOCUMENTS

JP 2004-327602 A 11/2004

* cited by examiner

*Primary Examiner*—Rexford Barnie
*Assistant Examiner*—Thienvu V Tran
(74) *Attorney, Agent, or Firm*—Foley & Lardner LLP

(57) ABSTRACT

A termination circuit that adjusts differences in the resistance values of wiring-layer resistance and transistor ON resistance so that a desired termination resistance value is obtained. A wiring-layer resistance 10 is connected between an input terminal 30, which connects to an input circuit 18, and a first node; a transistor group 12 is connected between the first node and ground; a wiring-layer resistance 11 is connected between the first node and a second node; and a transistor group 13 is connected between the second node and ground. Furthermore, a wiring-layer resistance 14 is connected between the input terminal 30 and a third node; a transistor group 16 is connected between the third node and power source VDD; a wiring-layer resistance 15 is connected between the third node and a fourth node, and a transistor group 17 is connected between a fourth node and power source VDD. The transistor groups 12, 13, 16, 17 comprise one or a plurality of transistors that are turned ON or OFF by respective control signals BN1 to BN4, BN5 to BN8, BP1 to BP4 and BP5 to BP8.

12 Claims, 7 Drawing Sheets

TERMINATION CIRCUIT AND SEMICONDUCTOR DEVICE COMPRISING THAT TERMINATION CIRCUIT

FIELD OF THE INVENTION

The present invention relates to a termination circuit and a semiconductor device that comprises that termination circuit, and more particularly to a termination circuit and a semiconductor device that comprises that termination circuit for which the resistance value is adjustable.

BACKGROUND OF THE INVENTION

When performing an interface between semiconductor devices, in order to prevent reflection of signals, impedance matching is performed using a termination circuit that has a termination resistance. In this case, a termination circuit may be used that has a function for going ON or OFF depending on the need for termination resistance. An example of the construction of a termination circuit having the simplest ON/OFF function is shown in FIG. 6. In FIG. 6, the signal that is input to the input terminal 120 is supplied to the input circuit 108 and is terminated by the termination circuit 110. The termination circuit 110 comprises wiring-layer resistors 100, 102, and transistors TN100, TP100 that are respectively connected in a cascade arrangement to them. The transistors TN100, TP100 are turned ON or OFF by control signals BN1, BP1, respectively. However, in the circuit construction shown in FIG. 6, when there are differences in the wiring-layer resistors and ON resistance of the transistors due to manufacturing, it is not particularly possible to adjust the resistance value, so those differences due to manufacturing are reflected as are on the termination resistance value.

Therefore, in order to suppress differences in termination resistance due to manufacturing, circuit construction as shown in FIG. 7 is possible. In FIG. 7, the termination resistance is formed by a combination of wiring-layer resisters 100, 102 formed on the wiring layer, and the resistance of the transistor groups 121, 122 that are respectively connected in a cascade arrangement to them. Here, the transistor group 121 is constructed using transistors TN1 to TN4 that are connected in parallel as shown in FIG. 2. Transistors TN1 to TN4 are constructed so that the sources are common and connected to ground, the drains are common and connected to the wiring-layer resistor 100, and the gates supply control signals BN1 to BN4, respectively. The W sizes (channel widths) of the transistors TN1 to TN4 are different from each other, and by setting the level of the control signals BN1 to BN4 to high/low level, the transistor group 121 becomes a variable resistance unit.

The transistor group 122 is constructed using transistors TP1 to TP4 that are connected in parallel as shown in FIG. 3. Transistors TP1 to TP4 are constructed so that the sources are common and connected to a power supply VDD, the drains are common and connected to the wiring-layer resistor 102, and the gates supply control signals BP1 to BP4, respectively. The W sizes (channel widths) of the transistors TP1 to TP4 are different from each other, and by setting the level of the control signals BP1 to BP4 to high/low level, the transistor group 122 becomes a variable resistance unit.

In the example described above, four transistors are arranged, and the W sizes of the transistors are such that they are respectively double each other, such TN2 (TP2) is double TN1 (TP1), and TN3 (TP3) is double TN2 (TP2). With this kind of construction, it is possible to produce $2^4-1=15$ different resistance values. By selecting the W sizes of the transistors after manufacturing while measuring the actual resistance values, it is possible to combine the resistance values.

The termination circuit shown in FIG. 7 can flexibly correspond to differences that occur in the construction of the transistors. For example, when the circuit is completed according to manufacturing standards, the variable values of resistance, or in other words, the W sizes of the transistors are set so that the seventh of fifteen different values is used. In this case, even when the transistor resistance per unit becomes two times higher than the manufacturing standard, by selecting the transistor with the largest variable value, or in other words, the largest W size, the ON resistance of the transistor can be made nearly the same as the set target value. On the other hand, when the transistor resistance per unit becomes less than the manufacturing standard, it is possible to make the ON resistance of the transistor correspond by selecting a transistor with a small W size.

It was explained above that for differences in transistors due to manufacturing, differences in transistor resistance up to 200% of the manufacturing standard pose no problem, however, actually, differences due to manufacturing also exist in the wiring-layer resistance. The method of how to set wiring-layer resistance and transistor resistance when differences of ±10% occur in wiring-layer resistance during the manufacturing process, will be explained below using concrete numerical values.

First, the case in which the target value of the termination resistance, or in other words, the sum of the wiring-layer resistance and transistor resistance is taken to be 300Ω will be considered. This value of 300Ω is a value defined by the specifications of the JEDEC (Joint Electron Device Engineering Council) standards for DDR (Double Data Rate) 2-type synchronous DRAM, and is normal as the value for termination resistance.

Equations are derived below that must be satisfied when setting each resistance value. Here, this will be explained for the wiring-layer resistance 100 and transistor group 121. The resistance value for the wiring-layer resistance 100 is taken to be r20, the resistance value for the transistor group 121 is taken to be r21, and the unit is taken to be Ω. It is possible to handle the wiring-layer resistance 102 and the transistor group 122 in the same way.

First, when considering just expanding the adjustment range, it is best that the minimum value r21(min) of the resistance value r21 be made as small as possible. However, since in actuality the W size of the transistor becomes large, the surface area of the elements of the element unit and input terminal capacitance are affected. When considering the example of the JEDEC standards for a DDR 2-type synchronous DRAM, the capacitance of the input/output terminals is limited to within 4.0 pF. Taking into consideration the limitations on the capacitance of the input/output terminals and the transistor performance, it is preferable that r21(min) be set within a range that will satisfy Equation (1) below.

$$r21(\text{min}) \geq 25 \quad \quad \text{Equation (1)}$$

Also, the wiring-layer resistance must be set so that the total resistance when combined with the variable resistance of the transistor, even when the wiring resistance value is a maximum due to manufacturing differences, is 300Ω. By taking the standard manufacturing value of the resistance value r20 to be X0, it is necessary that Equation (2) be satisfied.

$$X0 \times 1.10 + r21(\text{min}) \leq 300 \quad \quad \text{Equation (2)}$$

Another item that must be set is the ratio between the resistance value r21 and resistance value r20. Too large of a resistance ratio of the transistor section is unsuitable for actual specifications. Naturally, it is desirable that the termination resistance, including the voltage dependence and temperature dependence, be fixed. Here, the voltage dependence and temperature dependence of the resistance value of the wiring-layer resistance is generally small, so there is no problem. However, the voltage dependence and temperature dependence of the resistance due to the transistors is large. For example, considering the case of JEDEC standards for a DDR 2-type synchronous DRAM, for a product with voltage specifications of 1.8 V±0.1 V, and temperature specifications of 0 to 85° C., the transistor resistance value in this range fluctuates ±20% or more due to voltage and temperature. Therefore, when the ratio of the overall termination resistance that the transistor resistance occupies becomes large, a problem occurs in that the fluctuation in the overall termination resistance value occurs due to changes in voltage and temperature. Considering product specifications, it is preferable that the target value of the overall termination resistance be kept within ±5% even when dependence on voltage and temperature is taken into consideration. From these conditions it is necessary to satisfy Equations (3) and (4) below.

$$r20+r21\times1.2 \leq 300\times1.05 \quad \text{Equation (3)}$$

$$r20+r21\times0.8 \geq 300\times0.95 \quad \text{Equation (4)}$$

From Equations (3) and (4), it is necessary that r20 and r21 satisfy Equations (5) and (6).

$$r21 \leq 75 \quad \text{Equation (5)}$$

$$r20 \geq 225 \quad \text{Equation (6)}$$

Equation (6) must be satisfied even when the manufacturing range of the wiring-layer resistance becomes a minimum, so Equation (7) is obtained.

$$X0\times0.90 \geq 225 \quad \text{Equation (7)}$$

From Equations (1), (2) and (7), X0 must be set within the range of Equation (8) below.

$$247.5 \leq X0 \leq 250 \quad \text{Equation (8)}$$

Also, r21 must be set so that it can be adjusted within the range of Equation (9) below.

$$25 \leq r21 \leq 75 \quad \text{Equation (9)}$$

On the other hand, a semiconductor integrated circuit apparatus, having a unit similar to an adjustment unit for adjusting the aforementioned termination resistance, is disclosed in patent document 1. This semiconductor integrated circuit apparatus comprises a termination circuit that is located in an input circuit that receives input signals that are supplied from an external terminal and that comprises a plurality of MOSFETs that are connected in parallel to the aforementioned external terminal, and adjusts the resistance value of the termination resistance by adjusting the number of the plurality of MOSFETs to turn ON by a third control unit. This semiconductor integrated circuit apparatus has a termination circuit that includes a plurality of MOSFETS that are in parallel and resistance elements that are connected to them, so it is possible to easily construct a termination circuit that is matched to the signal-transmission path.

[Patent Document 1]
Japanese Patent Kokai Publicaton No. JP-P2004-327602A (FIG. 43)

SUMMARY OF THE DISCLOSURE

Suitable values for each of the resistance values in the prior art were explained. However, the differences in wiring-layer resistance are not the ±10% that were assumed in the previous calculation, but considering actual mass-production specifications, the differences may become about ±30%. When the differences become this large, it is not possible to obtain suitable termination resistance values for the prior art termination circuit described above.

From Equation (8), the suitable value for the wiring-layer resistance value was found to be about 250Ω, however, when the difference in wiring-layer resistance becomes +30%, r20=250×1.3=325Ω. Since no matter how low r21 is, it is at least 25Ω, so r20+r21=350Ω, which is greater than the target value of 300Ω.

When the difference in wiring-layer resistance becomes −30%, r20=250×0.70=175Ω. R21 must be adjusted to 125Ω, and does not satisfy Equation (9).

When r21 is adjusted to 125Ω, r21 is voltage and temperature dependent and changes by ±20%, or in other words, between 100 Ω to 150Ω. Therefore, the overall resistance value also fluctuates ±25Ω, from 275 Ω to 325Ω.

In the prior art circuit construction as described above, it is not possible to handle differences due to manufacturing in the wiring resistance that takes into consideration mass production specifications, and it becomes difficult to set the resistance value of the termination resistance within a target range.

On the other hand, for the termination circuit disclosed in patent document 1, setting the resistance value of the termination resistance within a target range is simple. However, in order to adjust the resistance value of the termination resistance with a certain amount of accuracy, it is necessary to have a plurality of MOSFETs in parallel, and have a large number of resistance elements connected to them, which causes the surface area of the termination circuit to become large. Also, the floating capacitance of the external terminal becomes large, which is not desirable.

Accordingly, it is an object of the present invention to provide a termination circuit having a small surface area, which takes into consideration mass production specifications, and is capable of setting the resistance value of the termination resistance within a target range in order to handle differences in wiring resistance due to manufacturing, and to provide a semiconductor apparatus comprising that termination circuit.

According to a first aspect of the present invention, there is provided a termination circuit that comprises: a first resistance element that is connected between an input terminal, which connects to an input circuit, and a first node; a first switch group that is connected between the first node and a first power source; a second resistance element that is connected between the first node and a second node; and a second switch group that is connected between the second node and the first power source.

In a second aspect, the termination circuit further comprises: a third resistance element that is connected between the input terminal and a third node; a third switch group that is connected between the third node and a second power source; a fourth resistance element that is connected between the third node and a fourth node; and a fourth switch group that is connected between the fourth node and the second power source.

In a third aspect, in the termination circuit of the second aspect, each of the first to fourth resistance elements are wiring-layer resistances.

In the fourth aspect, in the termination circuit of the second aspect, each of the first to fourth switch groups comprise one or a plurality of transistors that are turned ON or OFF by respective control signals.

In the fifth aspect, in the termination circuit of the second aspect, the input terminal is an input/output terminal that is further connected to an output circuit.

In the sixth aspect, there is provided a semiconductor apparatus that comprises the termination circuit of foregoing aspects (1st through 5th).

The meritorious effects of the present invention are summarized as follows.

With this invention, the resistance value of the termination resistance is variable and can be adjusted by a switch group that is connected between two different nodes. Therefore, it is possible to adjust the value of the termination resistance within a desired range, even when differences occur in both the ON resistance of the transistors of the switch group, and the wiring-layer resistance.

PREFERRED EMBODIMENTS OF THE INVENTION

Figure 1:
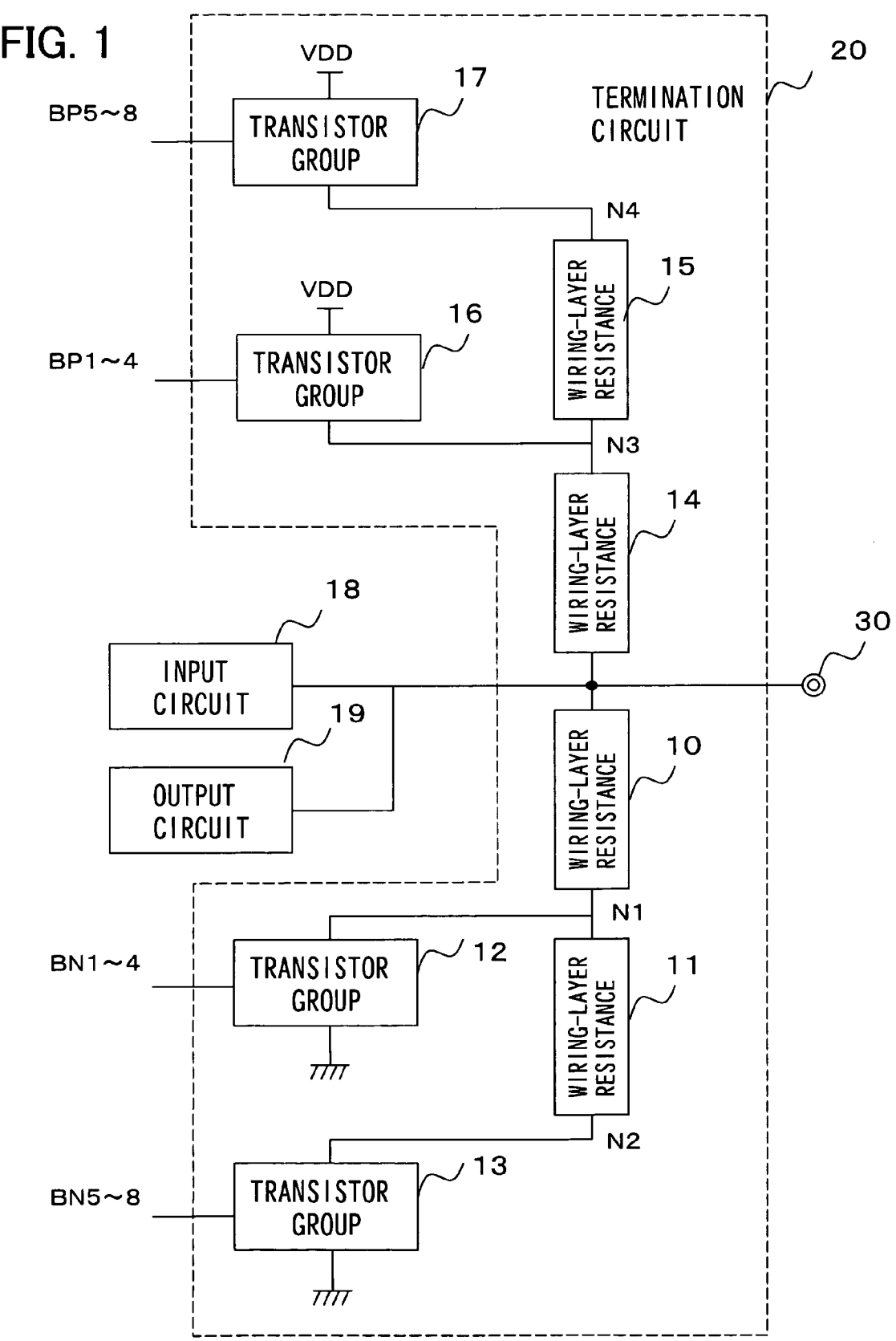
FIG. 1 is a circuit diagram of the termination circuit of an embodiment of the invention.

The termination circuit of an embodiment of the invention comprises: a first wiring-layer resistance (10 in FIG. 1) that is connected between an input terminal (30 in FIG. 1), which connects to an input circuit (18 in FIG. 1), and a first node (N1 in FIG. 1); a first transistor group (12 in FIG. 1) that is connected between the first node and ground; a second wiring-layer resistance (11 in FIG. 1) that is connected between the first node and a second node (N2 in FIG. 1); and a second transistor group (13 in FIG. 1) that is connected between the second node and ground. The termination circuit further comprises: a third wiring-layer resistance (14 in FIG. 1) that is connected between the input terminal and a third node (N3 in FIG. 1); a third transistor group (16 in FIG. 1) that is connected between the third node and power-source VDD; a fourth wiring-layer resistance (15 in FIG. 1) that is connected between the third node and a fourth node (N4 in FIG. 1); and a fourth transistor group (17 in FIG. 1) that is connected between the fourth node and power-source VDD. The first to fourth transistor group is constructed from one transistor or a plurality of transistors that are turned ON or OFF by respective control signals (BN1 to BN4, BN5 to BN8, BP1 to BP4 and BP5 to BP8 in FIG. 1).

The termination circuit constructed as described above can be adjusted so that the resistance value of the termination resistance can be changed by the first to fourth transistor groups. In other words, on the ground side, the resistance value of the termination resistance can be changed by the first and second transistor groups, or in other words, by two switch groups. Also, on the VDD side, the resistance value of the termination resistance can be changed by the third and fourth transistor groups, or in other words, by two switch groups. Therefore, even when differences due to manufacturing occur in both the ON resistance of the transistors of the transistor groups and wiring-layer resistance, it is possible to adjust the resistance within a range of desired termination resistance values. Also, only two wiring-layer resistances each need to be placed on the ground side and power-source VDD side, so the surface area of the termination circuit is small. This embodiment of the invention will be explained in detail below with reference to the drawings.

Embodiment 1

Figure 2:
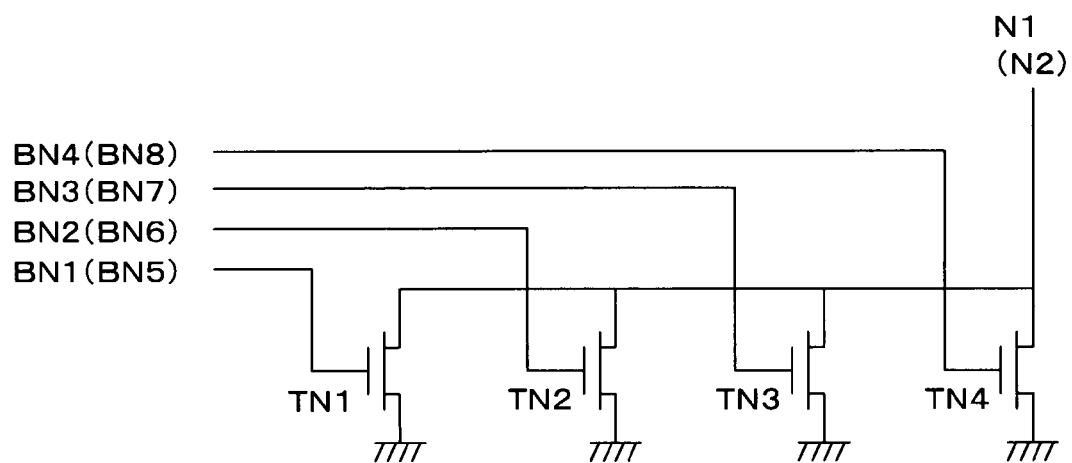
FIG. 2 is a circuit diagram of a transistor group.

FIG. 1 is a block diagram showing the construction of the termination circuit of an embodiment of the invention. In FIG. 1, the termination circuit 20 comprises: wiring-layer resistances 10, 11, 14, 15, and transistor groups 12, 13, 16, 17. One end of both the wiring-layer resistances 10, 14 are common and are connected to an input/output terminal 30. The other end of the wiring-layer resistance 10 (node N1) is connected to one end of the transistor group 12 and one end of the wiring-layer resistance 11. The other end of the transistor group 12 is grounded, and control signals BN1 to BN4 are given to the control end. The other end of the wiring-layer resistance 11 (node N2) is connected to one end of the transistor group 13. The other end of the transistor group 13 is grounded, and control signals BN5 to BN8 are given to the control side. Transistor groups 12, 13 are constructed from transistors TN1 to TN4 that are connected in parallel as shown in FIG. 2 and as explained above, and are respectively controlled by control signals BN1 to BN4 and BN5 to BN8 so that they go ON or OFF.

Figure 3:
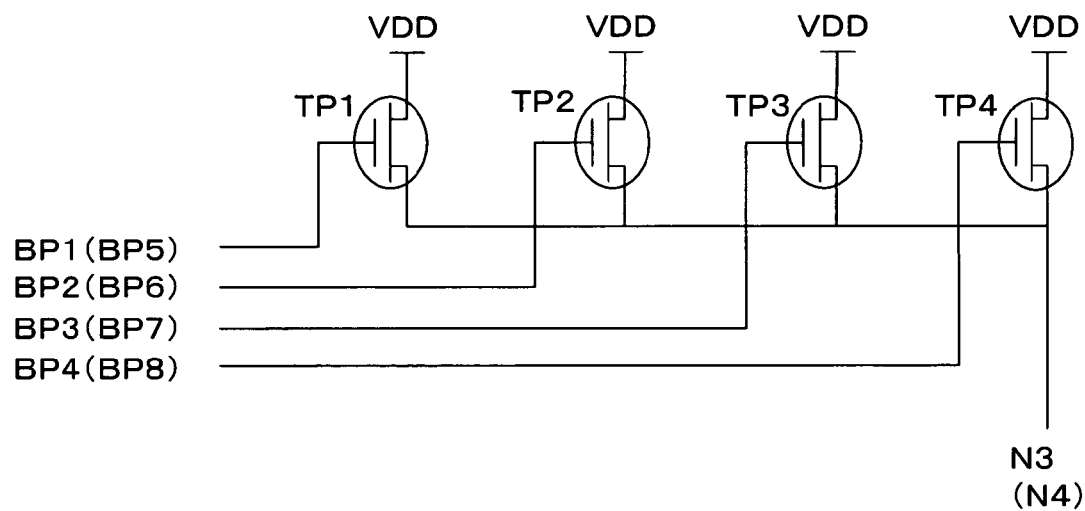
FIG. 3 is a circuit diagram of another transistor group.

On the other hand, the other end of the wiring-layer resistance 14 (node N3) is connected to one end of the transistor group 16 and one end of the wiring-layer resistance 15. The other end of the transistor group 16 is connected to the power source VDD, and control signals BP1 to BP4 are given to the control end. The other end of the wiring-layer resistance 15 (node N4) is connected to one end of the transistor group 17. The other end of the transistor group 17 is connected to the power source VDD, and control signals BP5 to BP8 are given to the control end. The transistor groups 16, 17 are constructed from transistors TP1 to TP4 that are connected in parallel as explained above and shown in FIG. 3, and are respectively controlled by control signals BP1 to BP4, BP5 to BP8 to go ON or OFF.

An input signal that is input to the input/output terminal 30 is input to the input circuit 18 after the impedance has been terminated by the termination circuit 20. In the output circuit 19, the output end is common with the input end of the input circuit 18, and the output circuit 19 outputs a signal to the input/output terminal 30. There is no output circuit 19 in the case that it is not required in the semiconductor apparatus.

It is possible to divide the construction of the invention into construction for two kinds of termination resistances. The construction on the ground GND side and the power-source side is the same, so the state of the termination resistance will be explained for the ground GND side. Here, r10 is the resistance value of the wiring-layer resistance 10, r11 is the resistance value of the wiring-layer resistance 11, r12 is the ON resistance of the transistor group 12, and r13 is the ON resistance of the transistor group 13.

The first termination resistance is constructed so that the wiring-layer resistances 10, 11 and transistor groups 12, 13 are all used. The termination resistance Z1 is expressed by equation (11) below.

$$Z1 = r10 + r12 \times (r11 + r13)/(r11 + r12 + r13) \qquad \text{Equation (11)}$$

The second termination resistance is constructed such that all of the transistors of the transistor group 12 are OFF, or in other words, such that the level of all of the control signals BN1 to BN4 are L level, and so that the ON resistance of the transistor group 12 is not used. The termination resistance Z2 is expressed by Equation (12) below.

$$Z2 = r10 + r11 + r13 \qquad \text{Equation (12)}$$

This embodiment aims at keeping the termination resistance at a fixed value by changing the construction of the resistance to correspond with differences due to manufacturing of the wiring-layer resistances 10, 11. From Equations (11) and (12), it is clearly seen that Z2 is greater than Z1. Therefore, when the wiring-layer resistance becomes higher than the middle manufacturing value, it is possible to select the construction according to Equation (11), and when the wiring-layer resistance becomes lower than the middle value, it is possible to select the construction according to Equation (12).

Next, how each of the resistance values are set for the wiring-layer resistances 10, 11, and transistor groups 12, 13 will be explained. As was done in the explanation of the prior art, an example will be explained in detail using numerical values. The target value for the termination resistance is taken to be 300Ω, and differences in the wiring-layer resistance due to manufacturing will be considered up to ±30%.

First, the transistor groups 12, 13 will be considered. It is self-explanatory that the maximum value can be made as large as desired by decreasing the W size of the transistor. In regards to setting the minimum values of the ON resistances of the transistor groups 12, 13, it is desired that the values be made as small as possible in order to increase the adjustment range, however, the only way to do that is to increase the size of the transistors. Therefore, restrictions for the element surface area and input-terminal capacitance of the transistor groups 12, 13 overlap. Considering the example of JEDEC standards for a DDR 2-type synchronous DRAM, the input-terminal capacitance is limited to within 4.0 pF. As was mentioned for the prior art, taking these conditions into consideration, the minimum values of the ON resistances of the transistor groups 12, 13 are r12(min) and r13(min), respectively, and under the same conditions of Equation (1), these minimum values are set within a range that satisfies Equation (13) below.

$$1/r12(\min) + 1/r13(\min) \leq 1/25 \qquad \text{Equation (13)}$$

Next, the wiring-layer resistances 10, 11 will be considered. The resistance values for the middle values of the differences due to manufacturing of the wiring-layer resistances 10, 11 are taken to be X and Y, respectively. Considering a maximum difference due to manufacturing of 30%, construction according to Equation (11) is suitable. Also in this case, forming an equation for calculation that makes it possible to obtain the target value of 300Ω, Equation (14) is obtained from Equation (11).

$$Z1 = 1.3X + r12 \times (1.3Y + r13)/(r12 + 1.3Y + r13) \leq 300 \qquad \text{Equation (14)}$$

On the other hand, considering the case in which the difference due to manufacturing in the wiring-layer resistance is a minimum, construction according to Equation (12) is suitable. Equation (15) is obtained from Equation (12).

$$Z2 = 0.7 \times X + 0.7 \times Y + r13(\min) \leq 300 \qquad \text{Equation (15)}$$

Also, in regards to the ratio between the transistor resistance component and the wiring-layer resistance component, taking into consideration the voltage and temperature dependency described in the example of the prior art, it is best that the percentage of the wiring-layer resistance be raised as high as possible. From Equations (5) and (6), a ratio of 1:3 or more is a necessary condition. From this condition and from Equation (15), Equation (16) is obtained.

$$0.7X + 0.7Y > 3 \times r13(\min) \qquad \text{Equation (16)}$$

An example of values for X, Y, r12 and r13 that satisfy Equations (13), (14), (15) and (16), is given by Equations (17) below.

$$X = 200\Omega,\ Y = 150\Omega,\ r12 \geq 47\Omega,\ r13 \geq 55\Omega \qquad \text{Equation (17)}$$

By using the design values given in Equation (17), it is possible to adjust the termination resistance to 300 Ω with middle temperature and pressure conditions by using construction according to Equation (11) even when the difference due to manufacturing in the termination resistance is 30% on the high side, which could not be obtained in the example of the prior art. Also, no particular problems occur even when the transistor-resistance section fluctuates ±20% due to fluctuation in voltage and temperature. First, in the case of a +20% change, the resistance Z1 becomes:

$$Z1 = 1.3X + 1.2 \times r12 \times (1.3Y + 1.2 \times r13)/(1.2 \times r12 + 1.3Y + 1.2 \times r13) = 306.4\Omega.$$

Even when the transistor resistance section changes −20%, Z1 becomes:

$$Z1 = 1.3X + 0.8 \times r12 \times (1.3Y + 0.8 \times r13)/(0.8 \times r12 + 1.3Y + 0.8 \times r13) = 292.5\Omega.$$

Therefore, as described above, the overall resistance can be kept within the range of 300±8Ω even when the voltage and temperature fluctuate.

Next, similar calculation is performed for the case in which the difference due to manufacturing in the wiring-layer resistance is −30% on the low side. In this case, the termination resistance can be adjusted to 300 Ω by using resistance construction according to Equation (12).

Furthermore, when the transistor resistance section fluctuates +20% due to fluctuation in the voltage and temperature, Z2 becomes:

$$Z2 = 0.7 \times X + 0.7 \times Y + 1.2 \times r13(\min) = 311\Omega.$$

Also, when the transistor resistance section fluctuates −20%, Z2 becomes:

$$Z2 = 0.7 \times X + 0.7 \times Y + 0.8 \times r13(\min) = 289\Omega.$$

Therefore, the fluctuation of the overall resistance is kept within the range of 300±11Ω. Compared with the prior art, differences in termination resistance due to voltage or temperature fluctuation are approximated to be ½ or less, and it is possible to keep the resistance within ±5% of the target value of 300Ω, which makes the invention very practical.

In the termination circuit of this embodiment as described above, the construction of the resistance circuit is changed by two switch groups, which are transistor groups. With this kind of construction, it is possible to adjust the termination resistance to a value sufficiently close to a target value, even when the differences in wiring-layer resistance due to manufacturing are ±30%, and when the fluctuation in ON resistance of the transistor groups is 20%.

Embodiment 2

An embodiment of constructing a resistance circuit having a termination resistance of 150 Ω will be given as a second embodiment. This number of 150 Ω is also a number defined by the specifications of the JRDEC standards for a DDR 2-type synchronous DRAM, and is a typical value used for termination resistance. A resistance circuit having construction as described in the first embodiment in which two 300 Ω resistances are in parallel is the simplest, and this resistance circuit can be constructed in this way. However, the effect on the input terminal capacitance, and the effect on the element surface area become large. Here, values are considered for the case of creating 150 Ω resistance using the circuit construction shown in FIG. 1.

When creating 150Ω, the conditions for the element surface area and the input capacitance according to it that are allowed for creating respective ON resistance values r12, r13 for the ON resistances 12, 13 of the transistor groups must be more relaxed than when creating 300 Ω termination resistance, so the conditions of Equation (13) are changed to obtain Equation (18).

$$1/r12(\min)+1/r13(\min) \leq 1/20 \quad \text{Equation (18)}$$

Also, the conditions of Equations (14) and (15) are changed as shown below.

$$Z1=1.3X+r12\times(1.3Y+r13)/(r12+1.3Y+r13) \leq 150 \quad \text{Equation (19)}$$

$$Z2=0.7\times X+0.7\times Y+r13(\min) \leq 150 \quad \text{Equation (20)}$$

By finding a solution to satisfy Equations (16), (18), (19) and (20), Equations (21) are obtained.

$$X=90\Omega, Y=70\Omega, r12 \geq 44\Omega, r13 \geq 37\Omega \quad \text{Equations (21)}$$

With these set values, it is possible to set the resistance to 150Ω from Equation (19), even when there are differences in the wiring-layer resistances of +30% from the manufacturing standard. Also, even when there is fluctuation of ±20% in transistor resistance due to voltage or temperature dependence, the termination resistance is kept within the range of 144 Ω to 155Ω. On the other hand, it is also possible to set the resistance to 150 Ω according to Equation (20) even when there are differences in the wiring-layer resistances of −30% from the manufacturing standard; and also when considering fluctuation of ±20% in transistor resistance due to voltage or temperature dependence, the termination resistance is kept within the range of 142 Ω to 158Ω.

Next, for what range each resistance value of the termination circuit is set will be explained, and it will be shown that the resistance values are not uniquely set. The values of Equations (21) were set by receiving Equation (18), however, the value on the right side of Equation (18), which sets the overall W size of the transistors, is set as described above by the overlap of the input terminal capacitance of the product and the element size. Also, similarly, Equation (16) is set by how much fluctuation in the termination resistance value due to voltage or temperature dependence can be allowed. In other words, Equations (16) and (18) are different according to product conditions, so each of the resistance values must be set correspondingly.

Figure 4:
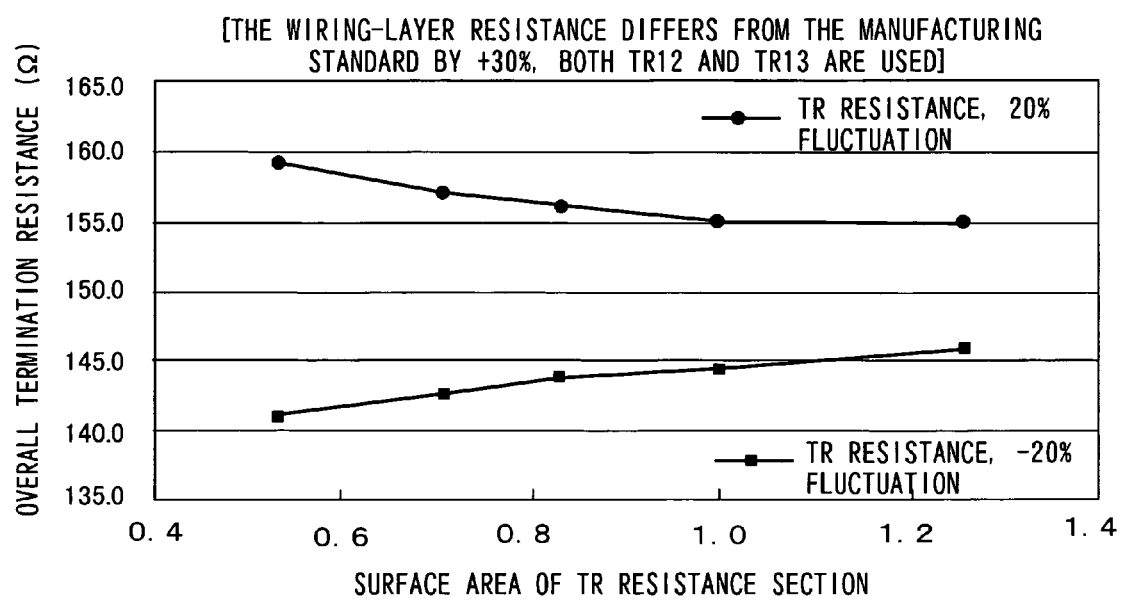
FIG. 4 is a first drawing showing the relationship between the surface area of the transistor resistance section and the value of the overall termination resistance.
Figure 5:
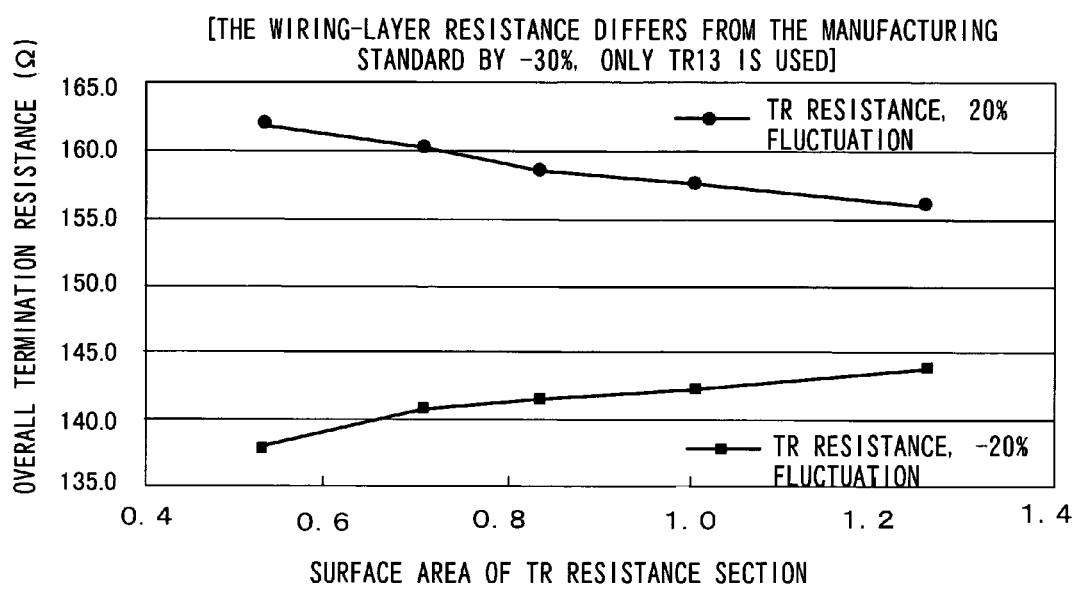
FIG. 5 is a second drawing showing the relationship between the surface area of the transistor resistance section and the value of the overall termination resistance.
Figure 6:
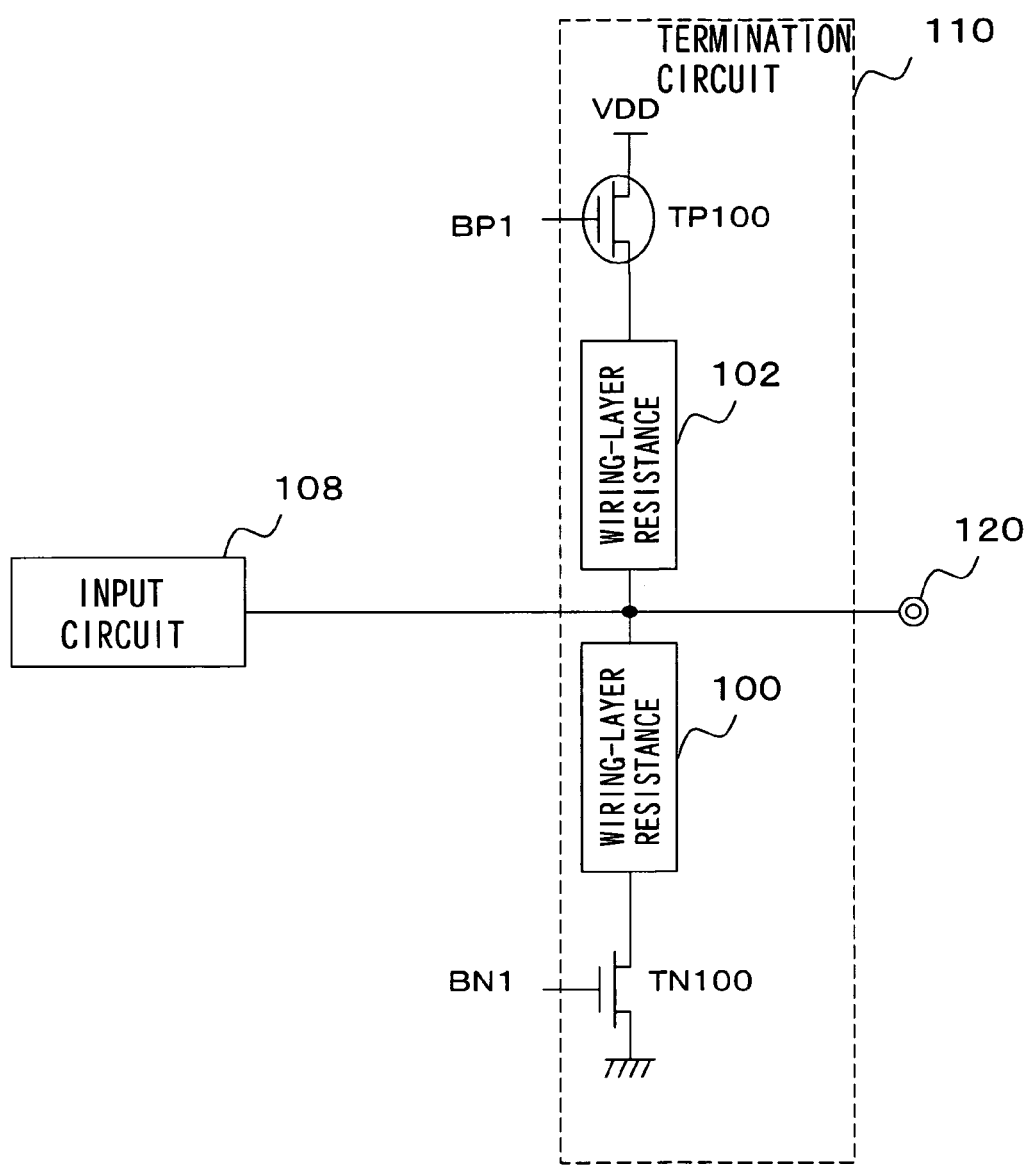
FIG. 6 is a circuit diagram of a prior art termination circuit.
Figure 7:
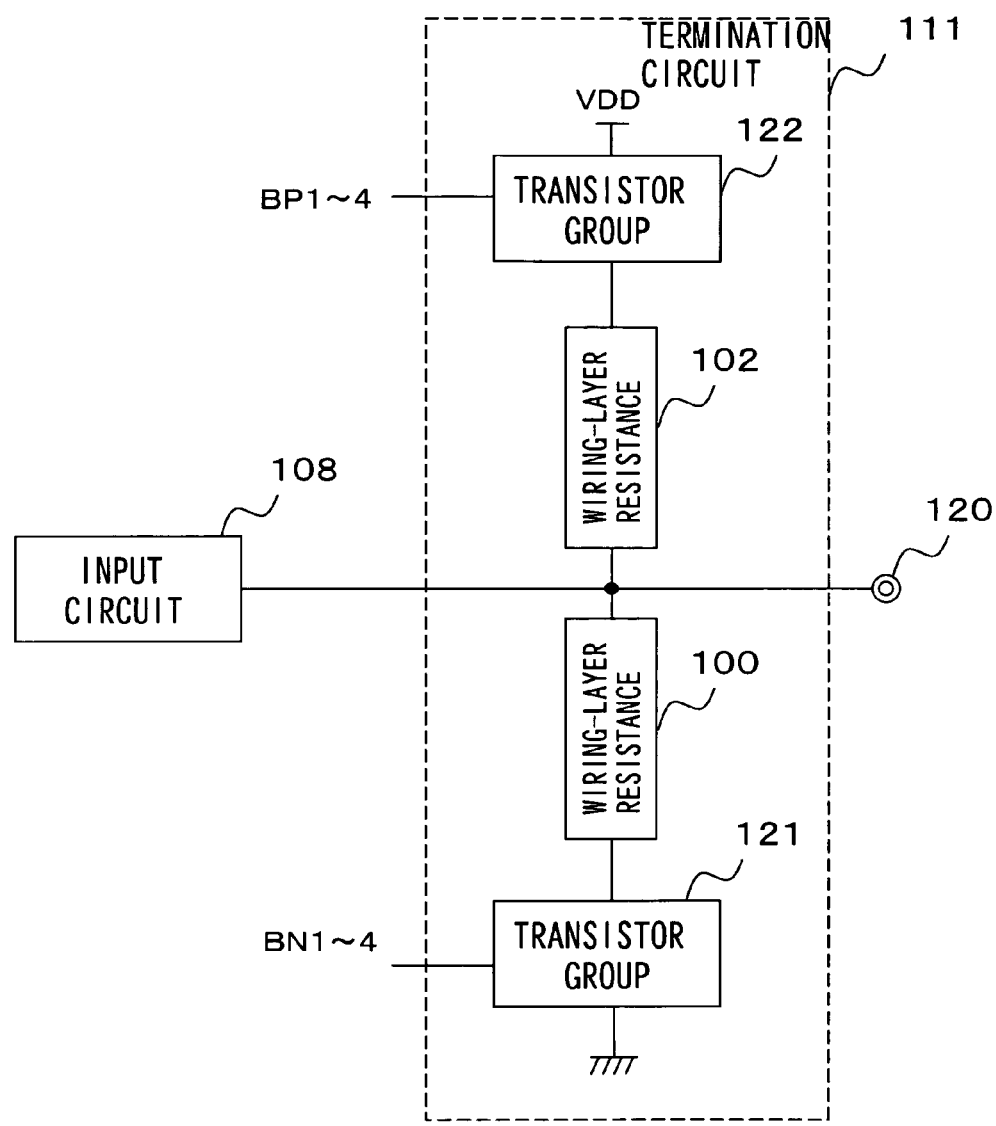
FIG. 7 is a circuit diagram of another prior art termination circuit.

Finally, an example of the relationship between the resistance component of the transistors (transistor surface area) and the termination resistance value (overall termination resistance) will be explained. First, each of the resistance values X, Y, r12 and r13 are calculated for the cases when the surface area is greater and less than the transistor size corresponding to the resistance values r12, r13 that were found from Equations (21). Furthermore, from the values of X, Y, r12 and r13, the temperature and voltage dependency of the overall resistance value is calculated, and that result is shown in FIG. 4 and FIG. 5. FIG. 4 shows the effect on the overall termination resistance when the wiring-layer resistance is greater than the manufacturing standard by +30%, the values of X, Y, r12 and r13 are found so that they satisfy Equation (19), and the difference in the transistor resistance component due to temperature and voltage dependence is ±20%. The surface area of the transistor resistance section along the horizontal axis is the standardized element surface area of r12 and r13, and the values found by Equation (21) are taken to be reference values 1. As can be seen from this graph, when the surface area of the transistor resistance section is increased, and the transistor resistance value is decreased, it hardly receives the effect of voltage and temperature dependency. However, when the surface area of the transistor resistance section is decreased, and only a large transistor resistance value is used, it readily suffers the effect of voltage and temperature dependency.

Also, FIG. 5 is similar to FIG. 4, and is a graph of the case where the wiring-layer resistance is −30% of the manufacturing standard, and calculation is performed so that Equation (20) is satisfied. As in FIG. 4, a relationship can be seen between the surface area of the transistor resistance and the voltage and temperature dependency of the termination resistance value. It is preferred that the characteristics shown in FIG. 4 and FIG. 5 be considered when determining how to set the surface area of the transistor resistance elements.

As can be clearly understood from the explanation above, each of the resistance values of the termination circuit are items set taking into consideration each of the conditions of the product, and are not limited to the values obtained from Equations (17) and (21) in the embodiments above.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A termination circuit, comprising:
   a first resistance element that is connected between an input terminal, which connects to an input circuit, and a first node;
   a first switch group that is connected between said first node and a first power source, said first switch group adjusting resistance value between the first node and the first power source;
   a second resistance element that is connected between said first node and a second node;
   a second switch group that is connected between said second node and said first power source, said second switch group adjusting resistance value between the second node and the first power source;
   a third resistance element that is connected between said input terminal and a third node;
   a third switch group that is connected between said third node and a second power source;
   a fourth resistance element that is connected between said third node and a fourth node; and
   a fourth switch group that is connected between said fourth node and said second power source.

2. The termination circuit of claim 1 wherein each of said first to fourth resistance elements are wiring-layer resistances.

3. A semiconductor apparatus that comprises the termination circuit of claim 2.

4. The termination circuit of claim 1 wherein each of said first to fourth switch groups comprise one or a plurality of transistors that are turned ON or OFF by respective control signals.

5. A semiconductor apparatus that comprises the termination circuit of claim 4.

6. The termination circuit of claim 4 wherein sources of the plurality of transistors are common and connected either to the first power source or the second power source.

7. The termination circuit of claim 4 wherein drains of the plurality of transistors are common and connected to the respective first to fourth resistance elements.

8. The termination circuit of claim 4 wherein gates of the plurality of transistors supply the respective control signals.

9. The termination circuit of claim 4 wherein the plurality of transistors are connected in parallel.

10. The termination circuit of claim 1 wherein said input terminal is an input/output terminal that is further connected to an output circuit.

11. A semiconductor apparatus that comprises the termination circuit of claim 5.

12. A semiconductor apparatus that comprises the termination circuit of claim 1.

* * * * *